US007724384B2

(12) United States Patent
Hwang et al.

(10) Patent No.: US 7,724,384 B2
(45) Date of Patent: May 25, 2010

(54) DISPLAYING PRINT JOB BASED ON ADJUSTMENTS MADE TO PRINTER DRIVER SETTINGS

(75) Inventors: Peter G. Hwang, Vancouver, WA (US); Corlene Ankrum, Vancouver, WA (US); Elizabeth Atwater, Vancouver, WA (US); Adam F. Page, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1075 days.

(21) Appl. No.: 11/170,688

(22) Filed: Jun. 29, 2005

(65) Prior Publication Data

US 2007/0002349 A1  Jan. 4, 2007

(51) Int. Cl.
G06F 3/12 (2006.01)
(52) U.S. Cl. .............. 358/1.13; 358/1.15; 358/1.18; 358/1.2; 715/209; 715/274; 715/810
(58) Field of Classification Search ........... 358/1.13
See application file for complete search history.

(56) References Cited

U.S. PATENT DOCUMENTS 5,317,732 A * 5/1994 Gerlach et al. ........... 707/104.1

| | | | |
|---|---|---|---|
| 6,222,638 B1 * | 4/2001 | Otala | 358/1.18 |
| 2002/0051166 A1 * | 5/2002 | Tomita | 358/1.13 |
| 2003/0056178 A1 * | 3/2003 | Sato | 715/527 |
| 2003/0231328 A1 * | 12/2003 | Chapin et al. | 358/1.13 |
| 2004/0070779 A1 * | 4/2004 | Ferlitsch | 358/1.13 |
| 2004/0184050 A1 * | 9/2004 | Silverbrook | 358/1.8 |

FOREIGN PATENT DOCUMENTS

GB     EP 0 933 692 A2 *   8/1999

OTHER PUBLICATIONS

Verypdf Document Printer v1.3 product summary, Jan. 22, 2005, downloaded from Internet Archive via URL: <http://web.archive.org/web/20050122043213/http://www.verypdf.com/artprint/index.html>.*
Jennifer Alspach, PDF with Acrobat 5: Visual Quickstart Guide, Peachpit Press, Aug. 31, 2001, Print ISBN-13: 978-0-201-74144-5, selected excerpts from chapter five.*
Microsoft Office Word 2003 Step by Step, by Online Training Solutions, Inc., Microsoft Press, Sep. 24, 2003, Print ISBN-13: 978-0-7356-1523-6, selected excerpts from chapter four.*

* cited by examiner

Primary Examiner—King Y Poon
Assistant Examiner—David S. Cammack

(57) ABSTRACT

One or more adjustable printer driver settings are displayed, and one or more pages of a print job corresponding to the document are displayed in accordance with the adjustable printer driver settings. The user is permitted to adjust the adjustable printer driver settings, such that the pages of the print job are redisplayed based on adjustments made to the adjustable printer driver settings.

28 Claims, 5 Drawing Sheets

DISPLAYING PRINT JOB BASED ON ADJUSTMENTS MADE TO PRINTER DRIVER SETTINGS

BACKGROUND

Printer drivers are computer programs that convert application computer programs' print jobs into the language that the printers understand. Many printers have settings that can be adjusted within their printer drivers, so that the printers may print jobs as desired by a user. For example, different color settings, media settings, duplexing settings, toner or ink saving settings, and so on, may be adjusted by the user within a printer driver for a given printer.

A difficulty with adjusting printer driver settings within a printer driver is that the user generally has no way to see how the adjustments made to the settings will affect a document to be printed without actually printing one or more pages of the document with the adjusted settings. As a result, users may waste media, as well as toner or ink, in the process of optimally adjusting the printer driver settings. This process can be time-consuming and frustrating to users.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Method

Embodiments of the invention are described in the detailed description as follows. First, a detailed method in which a user is permitted to adjust printer driver settings, and see the results of the adjustments to pages of an actual print job, before sending the print job to a printing device for printing the print job, is described. Next, some examples of how the user is able to adjust the printer driver settings are presented. Finally, an example system and printing device that can implement embodiments of the invention are described.

Figure 1:
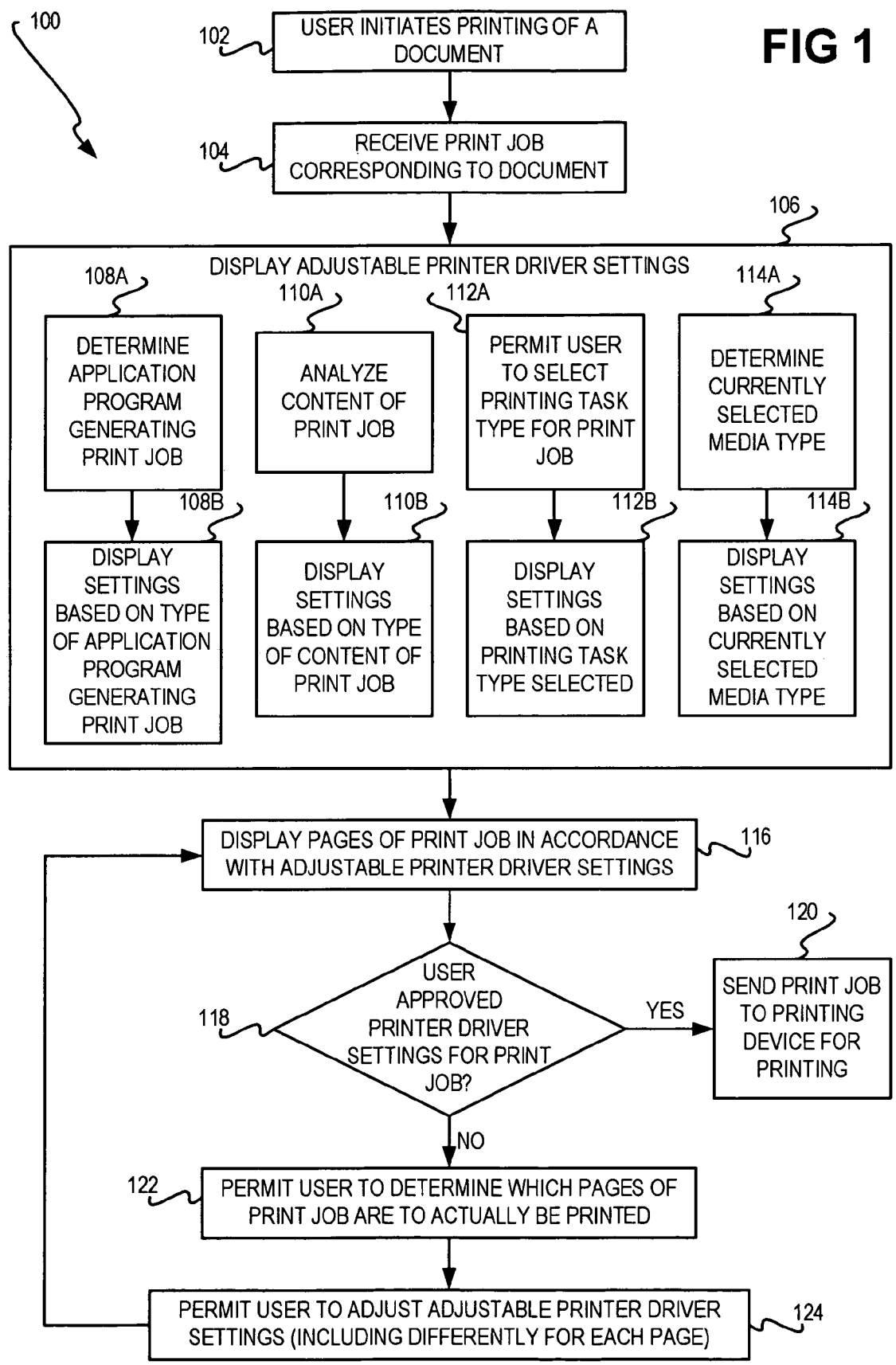
FIG. 1 is a flowchart of a method in which a user is permitted to adjust printer driver settings and see the results of the adjustments to the pages of an actual print job, before sending the print job to a printing device for printing the print job, according to an embodiment of the invention.

FIG. 1 shows a method 100 in which a user is permitted to adjust printer driver settings, and see the results of the adjustments to pages of an actual print job, before sending the print job to a printing device for printing the print job, according to an embodiment of the invention. The method 100 may in at least substantial part be performed by a printer driver for a printing device. A printer driver is a computer program that converts an application computer program's print jobs into the language that the printer to which the printer driver corresponds understands. The method 100 may be implemented as one or more computer program parts of a computer program stored on a computer-readable medium. The medium may be a volatile or a non-volatile medium, as well as an optical, a semiconductor, and/or a magnetic medium, or another type of a computer-readable medium.

A user first initiates the printing of a document within an application computer program (102). The document may be a word processing document, a spreadsheet document, one or more web pages of an Internet web site, as well as one or more photos or image files, among other types of documents. The application computer program may be a word processing program, a spreadsheet program, a web browsing program, a photo-editing or other type of image-related program, or another type of application computer program. The user typically initiates printing of the document in one of a number of different ways. For instance, after the desired document has been loaded into the application program or otherwise generated, the user selects a "print" menu item from a "file" menu of the application program, and then presses an "OK" or "print" button within a dialog box that appears. As a second example, the user may press a "print" button directly in the window of the application program, and then optionally press an "OK" or "print" button within a dialog box that appears. As a third example, the user may select a "print shortcut" or "print" icon in the upper left-hand corner in the windows of some application programs, without then having to press an "OK" or "print" button on any further dialog boxes.

As a result, the printer driver for the printing device on which the document is to be printed receives a print job from the application program that corresponds to the document (104). It is noted, then, that performance of 102 and 104 of the method 100 results in the application program sending a document to the printer driver for printing on the printing device. Subsequent adjustments to the printer driver settings that are made, as will be described, are thus performed as part of the "flow" of sending a document to a printing device for printing, as initiated by selecting a print command within an application program. By comparison, in the prior art, adjustment to printer driver settings are typically made by a user first selecting a printer, selecting a "properties" button to call up the printer driver settings, and after the settings have been adjusted, selecting a printer command within the application program. In other words, from the perspective of the application program, in one embodiment of the invention the application program believes that it is sending a document to a printing device for printing, whereas in actuality the printer driver is first permitting the user to modify printer driver settings before the document is actually printed.

Once the printer driver has received a print job corresponding to the document, it displays one or more adjustable printer driver settings that can be adjusted by the user as desired (106). The types of printer driver settings that can be adjusted are not limited by embodiments of the invention, and some specific examples of such printer driver settings are presented in the next section of the detailed description. However, in general, the printer driver settings relate to any type of adjustable printer-related setting that can affect the ultimate printing of the print job by the printing device with which the printer driver is associated. Such printer driver settings include: color settings, media settings, duplexing settings, toner or ink saving settings, and so on. Furthermore, the settings that are displayed may be related to separate functionalities and thus may be "meta" settings, adjustment of which actually result in the adjustment of one or more undisplayed lower-level printer driver settings. For instance, a user may able to specify that the quality of a photo or image filed be "best," "good," "standard," and "fast." Selecting one of these values can result in a number of lower-level printer driver settings being adjusted. This is because there may be no specific "quality" printer driver settings that directly affects the quality of the resulting image. Rather, a number of lower-level printer driver settings may instead be adjusted to realize a given "quality"-related printer driver setting.

In one embodiment, one or more of 108A and 108B, 110A and 110B, 112A and 112B, and 114A and 114B may be performed as part of displaying the adjusting printer driver settings in 106 of the method 100 of FIG. 1. First, the application program that generated the print job may be determined (108A), such that the printer driver settings are displayed in 106 based on the type of the application program that generated the print job (108B). The printer driver may receive the identity of the application program that generated the print job, or otherwise determine which application program generated the print job that has been received. In response, the printer driver displays the settings based on the type of this application program. For instance, print jobs generated by image-editing and other image-related application programs may, result in printer driver settings that are particular to photos and other types of images being displayed. By comparison, print jobs generated by other types of application programs, such as word processing programs and web browsing programs, may have a set of less photo or image specific printer driver settings displayed.

Second, the content of the print job may be analyzed (110A), such that the printer driver settings are displayed in 106 based on the type of the content of the print job (110B). The printer driver may scan the content of the print job to determine whether the print job includes primarily or only images, such as photos or other types of graphics. In response, the printer driver displays printer driver settings that are particular to photos and other types of images. If the print job does not include primarily images, or includes only text, the printer driver may instead display a set of more standard, and less photo or image specific, printer driver settings.

Third, a user may be permitted to select a particular printing task type for the print job (112A), such that the printer driver settings are displayed in 106 based on the printing task type selected (112B). The printing task type may be to print photos, to print text documents, or to print documents having a mix of photos and text. Based on the printing task type selected, the printer driver then displays printer driver settings that are specific to this printing task type. The printing task type may in one embodiment be selectable by the user within a host computing device, such as a desktop or laptop computer, as well as a digital camera device, on which the printer driver is running. The printing task type may in another embodiment be selectable by the user on or within the printing device that will be printing the print job, and with which the printer driver is associated, such that the printer driver receives the printing task type from this printing device. For instance, the printing device may have a number of buttons or other types of controls by which the user can select the printing task type.

Fourth, the currently selected media type may be determined (114A), such that the printer driver settings are displayed in 106 based on the currently selected media type (114B). The media type may be photo paper, inkjet paper, or regular office paper, such that different printer driver settings are displayed depending on the currently selected media type. For instance, if photo paper is selected, then it may be presumed that the print job relates to photos or other images, resulting in particular printer driver settings for photos and other types of images being displayed. By comparison, if regular office paper is selected, then a more standard and less photo specific set of printer driver settings may be displayed.

In one embodiment, the currently selected media type is determined based on the media tray or source selected by the user. For example, a printer may have two media trays or sources of paper, with which the user has previously associated the top tray as holding photo paper, and the bottom tray as holding regular office paper. Depending on the media tray selected by the user for printing the print job, the currently selected media type is thus determined. In another embodiment, the currently selected media type may be sensed or detected by the printing device, such that the printer driver receives this information from the printing device.

Next, one or more pages of the print job are displayed in accordance with the adjustable printer driver settings that have been displayed (116). The user is thus able to see how the current values of the printer driver settings affect the resulting printing of the print job by the printing device in a "what you see is what you get" (WYSIWYG) manner, without having to actually print the print job to "test" different printer driver settings. The number of pages of the print job that can be currently displayed may be limited based on the resolution of the display, or may be selected by the user. For instance, if the user chooses to view more pages, then less detail of each page will be shown, whereas if the user chooses to view fewer pages, then more detail of each page will be shown. The user may be permitted to scroll between all the pages of the print job, so that he or she can see how each page is likely to be printed using the current values of the printer driver settings.

Once the user has approved the printer driver settings for the print job (118), then the printer driver sends the print job to the printing device with which the printer driver is associated, for printing the print job (120). For instance, the user may press a "print" button within the printer driver, or otherwise approve the printer driver settings so that actual printing of the print job is initiated. However, before approving the printer driver settings, the user is permitted by the printer driver to determine which pages of the print job are to actually be printed (122), as well as to adjust the adjustable printer driver settings (124). The method 100 thus repeats at 116, with the pages of the print job that are to be printed, as may have been updated, being displayed in accordance with the adjustable printer driver settings, as may have been adjusted.

With respect to 122 of the method 100, the user is able to determine which pages of the print job are to actually be printed by the printing device with which the printer driver is associated. It is noted that this selection occurs after the user has initiated printing of a document within an application program in 102. Thus, the application program may afford the user with a first opportunity to determine which pages are to be actually printed by the printing device in 102, whereas the printer driver affords the user with another opportunity in 122. This second opportunity is advantageous for at least two reasons. First, when the user commits to printing a document, the application program in question may not afford the user with an opportunity to see what is being printed on each page. For example, it is sometimes difficult in web browsing programs to determine what part of a web page is being printed on each page of a print job. Thus, being able to determine which pages are to be actually printed after the user has committed to printing a document is advantageous in this type of scenario.

Second, some types of application programs do not provide for very robust specification of which pages of a document are to be printed. For example, a document may have twenty pages, but a user may only be able to specify a contiguous range of pages to be printed, like pages 1-7, or pages 5-10, and so on. The user may not be able to specify discontiguous ranges of pages, such as to print pages 1, 3, 5-9, and 15-20. Therefore, being able to determine or select which pages are to be actually printed after the user has committed to printing a document is advantageous in this type of scenario as well. The user may be able to select which pages are to be actually printed by dragging the pages that are not to be printed on a trash can icon within a graphical user interface, for instance, in one embodiment of the invention.

With respect to 124 of the method 100, the user is able to adjust all the printer driver settings that have been displayed in 106. As the user adjusts the printer driver settings, the currently displayed pages of the print job are redisplayed, or their display is readjusted, so that these pages are displayed in accordance with and reflect the adjustments made to the printer driver settings. The user can therefore interact with the printer driver iteratively, in real time: adjusting a printer driver setting, seeing how the adjustment will likely affect printing of pages of the print job, readjusting the printer driver setting, or adjusting another printer driver setting, and so on. The user thus does not have to print out pages of an actual document or print job to see how the printing device in question is likely to take into account adjustments made to the printer driver settings. As a result, the process of tweaking printer driver settings to achieve optimal such settings is more easily accomplished by the user.

With further respect to 124 of the method 100, the user is able to adjust the printer driver settings differently for each page or group of pages of the print job. For example, a given print job may include a number of photos, and a number of text pages. The user may wish to have different settings for pages that include photos, as opposed to pages that include just text. As a result, each page of the print job is capable of having its own printer driver settings, so that optimal print quality can be achieved for each page of the print job, even if the pages of the print job have different types of graphics, photos, text, and so on.

It is noted that particular parts of the method 100 have been ascribed to being performed by an application computer program or a printer driver. However, in another embodiment of the invention, at least some of the parts of the method 100 that have been ascribed to being performed by a printer driver may instead be performed by just an application computer program. For instance, in such an alternate embodiment of the invention, 104 may not be performed at all, and 102, 106, 108A and 108B, 110A and 110B, 112A and 112B, 114A and 114B, 116, 118, 120, 122, and 124 may all be performed by an application computer program. In such an embodiment, the printer driver settings are thus modified within the application computer program, instead of within the printer driver. In 120 of the method 100, then, the application computer program would send the print job to the printer driver, for printing on the printing device.

EXAMPLES

Figure 2:
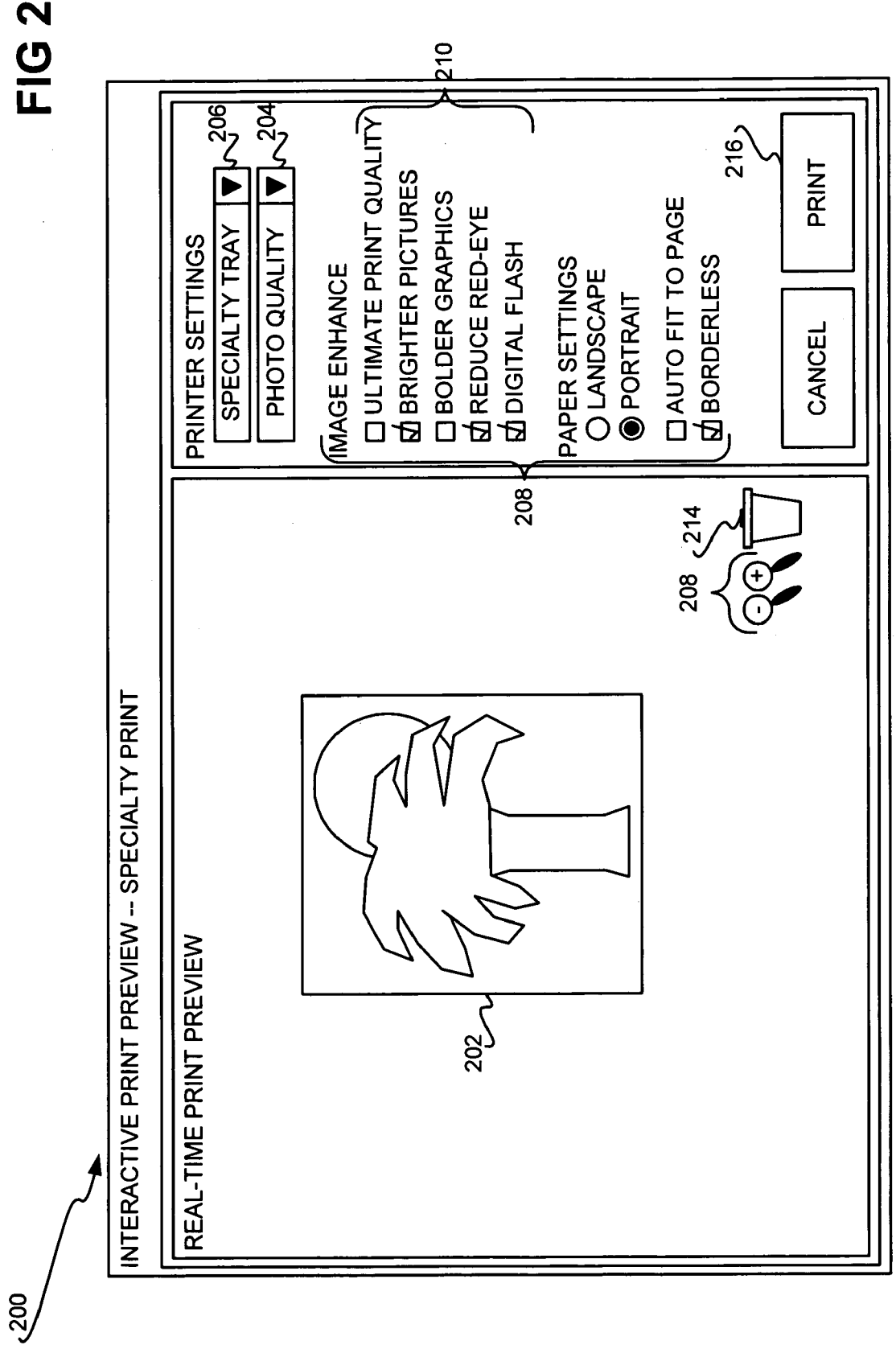
FIGS. 2, 3, and 4 are diagrams of example windows that may be displayed by a printer driver after printing has been initiated within an application program in order for the user to be able to adjust printer driver settings and see the results of the adjustment for an actual print job, according to an embodiment of the invention.
Figure 3:
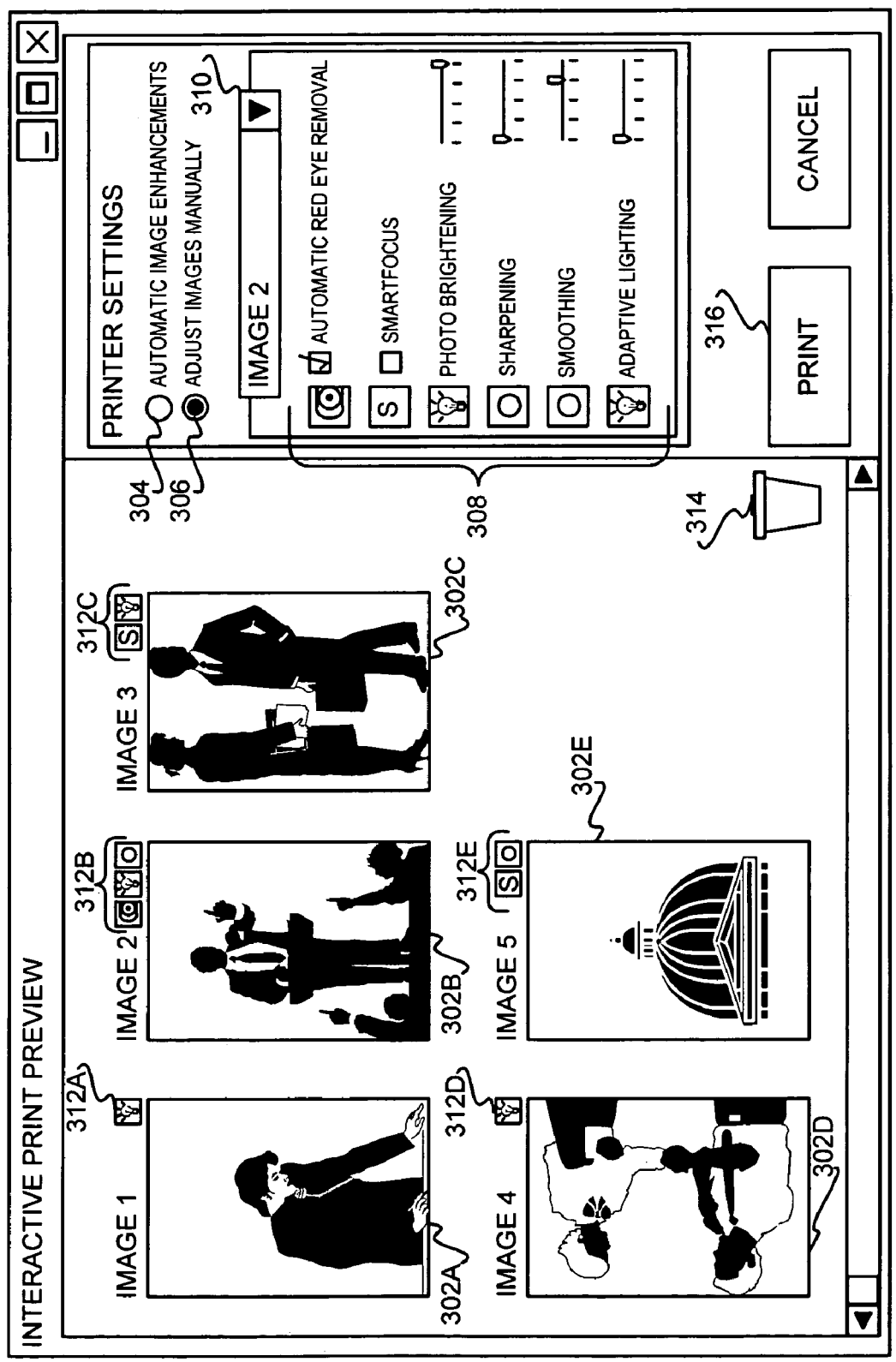
Figure 4:
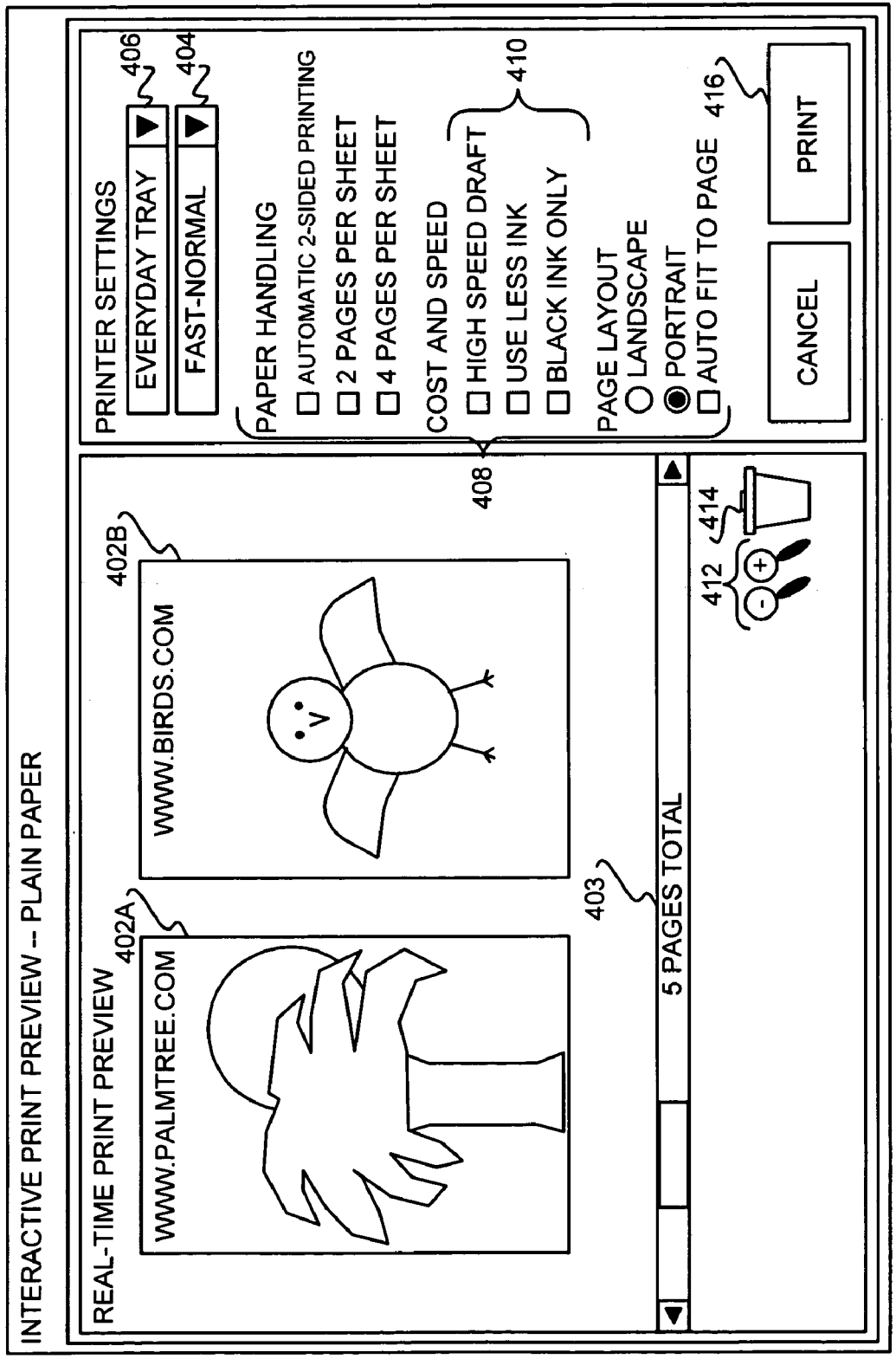

FIGS. 2, 3, and 4 show example windows that may be displayed in 106 of the method 100 of FIG. 1, after a user has initiated printing in an application program in 102 of the method 100, such that the user is able to determine which pages are to be printed in 122 and is able to adjust the printer driver settings in 124 of the method 100, according to an embodiment of the invention. In FIG. 2, the window 200 is depicted for a print job that has a single image 202. The printing task type may be selected by the user via the drop-down list box 204, to perform 112A of the method 100, where the initial value of the printing task type, "photo quality," may be the default for the printing device in question. The currently selected media type may be selected by the user via the drop-down list box 206, to perform 114A of the method 100, where the initial value of the currently selected media type, "specialty tray" (i.e., a tray of media holding specialty paper, such as photo paper), may be the default.

Based on the values of the printing task type and the currently selected media type, the printer driver may display the particular printer driver settings 208 depicted in the window 200 of FIG. 2, which are particular to printing photos and other types of images. The printer driver may further display the particular printer driver settings 208 depicted in the window 200 based on analyzing the content of the print job, performing 110A and 110B of the method 100, and/or based on determining the application program that generated the print job, performing 108A and 108B of the method 100. Each of the printer driver settings 208 can be individually manipulated, such that as the settings 208 are unselected or selected, the image 202 is redisplayed based on these adjustments, for real-time, "what you see is what you get" (WYSIWYG) functionality. That is, in general, selecting a given printing task type results in the display of different printer driver settings 208, and/or different values for these printer driver settings 208.

Furthermore, it is noted that the printer driver settings 210 in particular correspond to particular types of functionality, such as "ultimate print quality," "brighter pictures," "reduction of red eye," and so on. Selection of any of these printer driver settings 210 causes one or more lower-level printer driver settings, which are not exposed to the user in the window 200 of FIG. 2, to be adjusted to achieve the desired functionality. For instance, selecting "brighter pictures" may cause a number of different color-related printer driver settings to be adjusted to brighten the image 202, whereas selecting "reduce red eye" may cause the image 202 to be scanned, and areas likely to correspond to eyes having their red color reduced. The printer driver settings 210 are thus "meta" settings that group lower-level printer driver settings that may not be directly adjustable by the user.

The user may further select the zoom-in and zoom-out controls 212 to increase the size or decrease the size of the image 202 within the window 200, to better gauge the effects of adjustments made to the printer driver settings 208. The user may select the image 202, and then select the trash can control 214, or drag the image onto the trash can control 214, to remove the image 202 from the current print job (which in the example of FIG. 2, effectively cancels the print job from being printed, since the print job includes just the image 202, and no other images). Once the user has adjusted the printer driver settings 208 as desired, he or she may select the print button 216 to actually send the print job to the printing device.

In FIG. 3, the window 300 is depicted for a print job that has a number of images 302A, 302B, 302C, 302D, and 302E, collectively referred to as the images 302. As used herein, the images 302 of the print job correspond to print job pages as has been described in the previous section of the detailed description, and the terminology "a page of a print job" encompasses an individual image of a print job as well. That is, the images 302 of the print job may be considered the pages of the print job, where one, or more than one, of the images 302 may be printed on each sheet of media, such as each sheet of paper, by the printing device.

The printer driver settings 304, 306, and 308 may be displayed in the window 300 by performing 106 of the method 100. Thus, the application program generating the print job having the images 302 may have been determined as being an image or a photo-related program, the content of the print job have been analyzed such that it was determined that the print job includes images, a user may have selected a printing task type, and/or the current selected media type may have been determined. As a result, the printer driver settings 304, 306, and 308 are printer driver settings particular to image-related print jobs, as opposed to more general purpose print jobs, such as word processing documents and the like.

By selecting the printer driver setting 304, the user is selecting a printer driver setting that corresponds to a desired functionality, namely, automatic image enhancements for all the images of the images 302. The printer driver therefore modifies lower-level printer driver settings for each of the images 302, to result in optimal image quality for all of the images 302, such that the printer driver setting 304 is a "meta" setting as has been described. If the user alternatively selects the printer driver setting 306, then he or she is able to individually manipulate the printer driver settings 308 the images 302, either individually or as a group.

To adjust the printer driver settings 308 for all of the images 302, the user first selects all of the images 302 in the left part of the window 300, by individually selecting, each image while holding down the shift key, for instance. Alternatively, the user may select all of the images 302 by selecting "all images" from the drop down box 310. To adjust the printer driver settings 308 for one of the images 302, the user first selects the desired image by selecting it in the left part of the window 300. Alternatively, the user may select the desired image from the drop down box 310. Once the desired image or images have been selected, the user can then adjust the printer driver settings 308 for the selected images.

Once the user has adjusted one or more of the printer driver settings 308 for a given image or image, icons 312 are correspondingly displayed over the images 302 that denote which settings have been adjusted for which images. Thus, the image 302A has an icon 312A, indicating that the image 302A has had the photo brightening setting adjusted in relation thereto. The image 302B has icons 312B, indicating that the image 302B has had automatic red eye removal, photo brightening, and smoothing settings adjusted in relation thereto. The image 302C has icons 312C, indicating that the image 302C has had smart focus and photo brightening settings adjusted in relation thereto. The image 302D has an icon 312, indicating that the image 302D has had the photo brightening setting adjusted in relation thereto. Finally, the image 302E has icons 312E, indicating that the image 302E has had smart focus and sharpening settings adjusted in relation thereto.

In one embodiment, selecting one of the icons 312 can result in a graphical user element being displayed in which the user may adjust the printer driver setting corresponding to the icon in relation to the image with which the icon is associated. Thus, in the window 300, there are at least two ways a user is able to individually adjust printer driver settings for the images 302. First, the user may directly manipulate the printer driver settings 308 in the right part of the window 300. Second, the user may manipulate the printer driver settings by selecting the icons 312.

The user may further select one or more of the images 302, and then select the trash can control 314, or drag the selected images onto the trash can control 314, to remove the selected images from the current print job. In this way, the user is able to control which pages of the print job are to be actually printed, even after initiating printing in the application program that generated the print job. Finally, once the user has adjusted the printer driver settings 308 as desired, he or she may select the print button 316 to actually send the print job to the printing device. Furthermore, in another embodiment of the invention, the user can select one of the icons 312, and drag the selected icon onto a selected one of the images 302, in order to allow the printer driver setting associated with the selected icon to be changed for the selected image.

In FIG. 4, the window 400 is depicted for a print job that has five total pages 402, including the pages 402A and 402B that are specifically shown in FIG. 4. The other of the pages 402 may be displayed by using the slider control 403, and/or by appropriate using the zoom-in and zoom-out controls 412. The printing task type may be selected by the user via the drop-down list box 404, to perform 112A of the method 100, where the initial value of the printing task type, "fast-normal," may be the default for the printing device in question. The currently selected media type may be selected by the user via the drop-down list box 406, to perform 114A of the method 100, where the initial value of the currently selected media type, "everyday tray" (i.e., a tray of media holding regular paper, to be used for everyday-type printing tasks), may be the default. In another embodiment, the currently selected media type may be the media type that is associated with the media that is currently loaded in the media tray at the printing device itself.

Based on the values of the printing task type and the currently selected media type, the printer driver may display the particular printer driver settings 408 depicted in the window 400 of FIG. 4, which are particular to printing non-photo type documents, such as web pages, word processing documents, and so on. The printer driver may further display the particular printer driver settings 408 depicted in the window 400 based on analyzing the content of the print job, performing 110A and 110B of the method 100, and/or based on determining the application program that generated the print job, performing 108A and 108B of the method 100. Each of the printer driver settings 408 can be individually manipulated, such that as the settings 408 are unselected or selected, the image 402 is redisplayed based on these adjustments, for real-time, "what you see is what you get" (WYSIWYG) functionality. The printer driver settings 408 are organized in groups, such as "paper handling," "cost and speed," and "page layout." That is, in general, selecting a given printing task type results in the display of different printer driver settings 408, and/or different values for these printer driver settings 408.

Furthermore, it is noted that the printer driver settings 410 in particular correspond to particular types of functionality, such as "high speed draft," "use less ink," and "black ink only." Selection of some of these printer driver settings causes one or more lower-level printer driver settings, which are not exposed to the user in the window 400 of FIG. 4, to be adjusted to achieve the desired functionality. For instance, selecting "use less ink" may cause a number of different color-related printer driver settings to be adjusted so that less ink is employed in printing the print job having the pages 402. Some of the printer driver settings 410 are thus "meta" settings that group lower-level printer driver settings that may not be directly adjustable by the user.

The user may further select the zoom-in and zoom-out controls 412 to increase the size or decrease the size of the pages 402 within the window 400, to better gauge the effects of adjustments made to the printer driver settings 408, as well as to display more of the pages 402 within the window 402. The user may select one or more of the pages 402, and then select the trash can control 414, or drag the selected pages onto the trash can control 414, to remove the selected pages from the current print job. Once the user has adjusted the printer driver settings 408 as desired, he or she may select the print button 416 to actually send the print job to the printing device.

System and Conclusion

Figure 5:
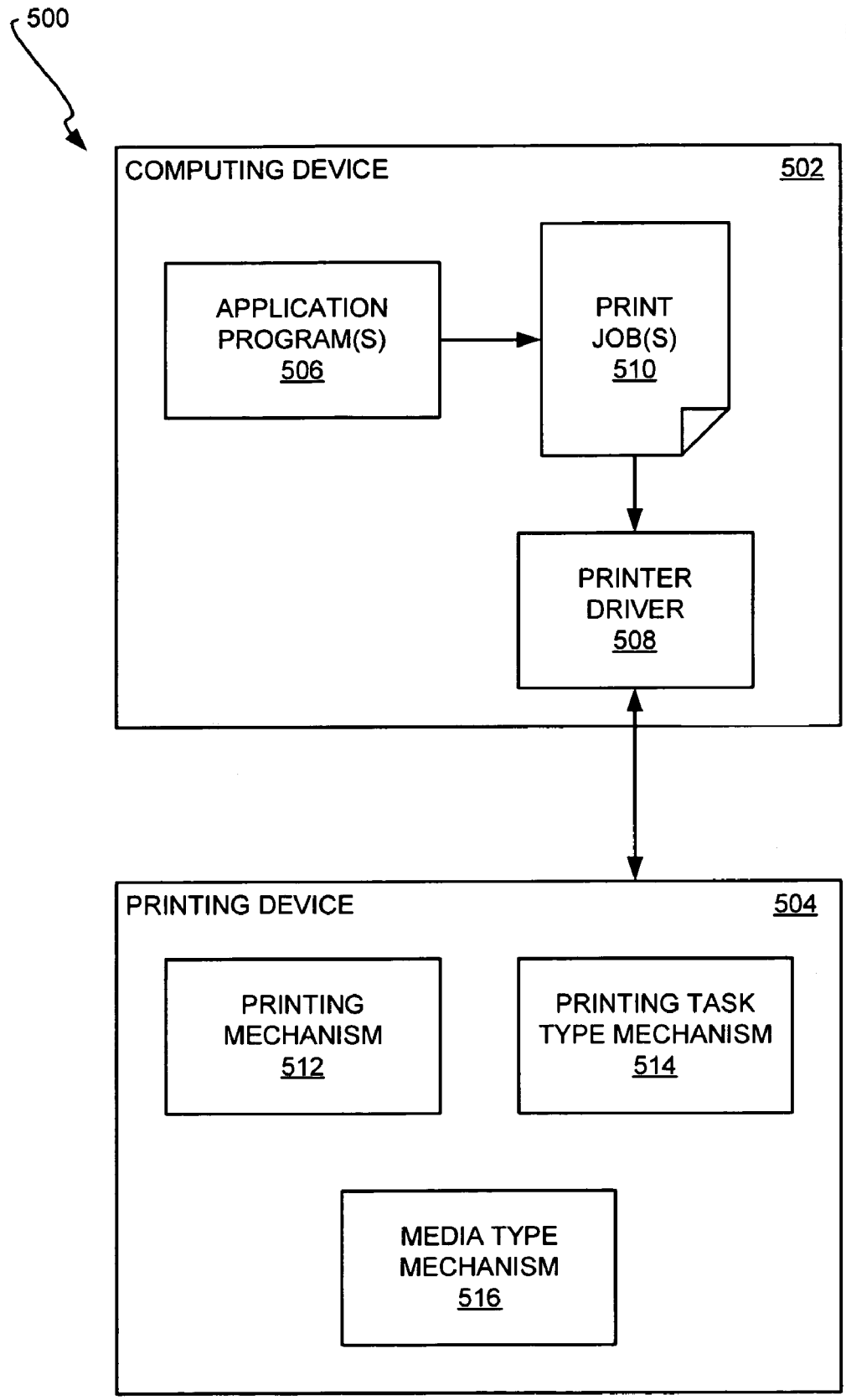
FIG. 5 is a block diagram of a system in which the user is able to adjust printer driver settings, and see the results of the adjustments for an actual print job, according to an embodiment of the invention.

FIG. 5 shows a system 500 in conjunction with which a user may be able to adjust printer driver settings after printing has been initiated within an application program, according to an embodiment of the invention. The system 500 thus includes a computing device 502 and a printing device 504. The computing device 502 includes one or more application programs 506 and a printer driver 508, whereas the printing device 504 includes a printing mechanism 512, and optionally a printing task type mechanism 514 and/or a media type mechanism 516. As can be appreciated by those of ordinary skill within the art, the system 500, the computing device 502, and the printing device 504 may each include other components, in addition to and/or in lieu of those depicted in FIG. 5.

The computing device 502 may be a desktop or a laptop computer, as well as a different type of computing device, such as a digital camera device, a mobile phone device, a personal digital assistant (PDA)-type device, and so on. The application programs 506 can each be word processing programs, image or photo-related programs, web browsing programs, or other types of application programs. The application programs 506 generate documents, from which print jobs 510 are generated when a user initiates printing within the application programs 506. The printer driver 508 receives the print jobs 510 generated by the application programs 506. The printer driver 508, as has been described, permits a user to adjust adjustable printer driver settings, and displays one or more pages of a print job as adjustments are made to the printer driver settings.

The printer driver 508 may also permit the user to differently adjust the printer driver settings for each page, such as each image, of a print job. The printer driver 508 may further permit the user to determine which of the pages of a print job are to be actually printed by the printing device 504, and thus which of the pages of the print job are to be actually sent to the printing device 504 for printing. As has been described, the printer driver 508 may further display the printer driver settings in accordance with one or more of: the type of the application program that generated a given print job; the type of content of the print job; a printing task type selected for the print job; and, a currently selected media type on which the print job is to be printed. The printer driver 508 sends a print job to the print device 504 upon the user approving the printer driver settings for the print job, as adjusted by the user.

The printing device 504 may be a printer, a multi-function or all-in-one device, or another type of printing device. The printing mechanism 512 may be a color and/or black-and-white inkjet-printing mechanism, a color and/or black-and-white laser-printing mechanism, or another type of printing mechanism, such that the printing device 504 is an inkjet-printing device, a laser-printing device, or another type of printing device. The printing mechanism 512 prints a print job received from a host device, such as the computing device 502.

The printing task type mechanism 514 may be an input mechanism, such as one or more buttons or controls, along with an associated display or indicator lights. The printing task type mechanism 514, where present, permits a user to select the printing task type on the printing device 504 itself. The printing task type is then communicated to the printer driver 508, which displays printer driver settings in accordance with the printing task type selected.

The media type mechanism 516 may also be an input mechanism, such as one or more buttons or controls, along with an associated display or indicator lights. Where the media type mechanism 516 is an input mechanism and is present, it permits a user to select the media type on which a print job is to be printed. That is, it can be said that the mechanism 516 determines the media type of the media inserted into the printing device 504. The media type mechanism 516 communicates the media type to the printer driver 508, which displays printer driver settings in accordance with the media type determined.

Alternatively or additionally, the media type mechanism 516 may be a detection mechanism, which detects the type of media inserted into the printing device 504. In this way, the media type mechanism 516 in this alternative embodiment also determines the media type of the media inserted into the printing device 504. The user may then be able to select a desired media type from the different types of media inserted into the printing device, on which to print a given print job. In one embodiment, the media type mechanism 516 detects the type of media inserted into the printing device 504 based on the current type of media tray (regular paper, photo paper, and so on) that is inserted into the printing device 504. The media type mechanism 516 again communicates the media type selected, or determined if the user has not particularly selected a given type of media, to the printer driver 508, which displays printer driver settings in accordance therewith.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method comprising:
in response to a user selecting a print command within an application computer program, and then in response to the user pressing a print button or an OK button on a dialog box displayed as a result of the user selecting the print command within the application computer program,
receiving a print job by a printer driver from the application computer program, the print job corresponding to a document of the application computer program;
determining the application computer program that generated the print job;
displaying a window different than the dialog box;
after receiving the print job and determining the application computer program that generated the print job, selecting and displaying one or more adjustable printer driver settings of a printer driver for a physical printing device adapted to print on physical media, the adjustable printer driver settings specific to the physical printing device to which the printer driver corresponds, the adjustable printer driver settings selected in accordance with a type of the application computer program that generated the print job, the adjustable printer driver settings displayed within the window;

displaying one or more pages of a print job corresponding to the document in accordance with the adjustable printer driver settings, the pages of the print job displayed within the window such that both the adjustable printer driver settings and the pages of the print job are simultaneously viewable within the window without the adjustable printer driver settings overlapping the pages of the print job and vice-versa; and, permitting the user to adjust the adjustable printer driver settings, such that the pages of the print job are automatically redisplayed based on adjustments made to the adjustable printer driver settings, where the pages of the print job are automatically redisplayed to reflect the adjustments made to the adjustable printer driver settings without the user having to provide further input to cause the pages of the print job to be redisplayed to reflect the adjustments made to the adjustable printer driver settings.

2. The method of claim 1, further comprising, in response to the user approving the adjustable printer driver settings for the print job, sending the print job to a printing device with which the printer driver is associated for printing the print job.

3. The method of claim 1, further comprising permitting the user to select a printing task type for the print job, such that the adjustable printer driver settings are displayed in accordance with the printing task type selected for the print job by the user.

4. The method of claim 3, wherein the printing task type is selectable by the user within a host device on which the printer driver is running.

5. The method of claim 3, wherein the printing task type is received from the physical printing device with which the printer driver is associated and that will be printing the print job.

6. The method of claim 1, further comprising determining a currently selected media type on which the print job is to be printed, such that the adjustable printer driver settings are displayed in accordance with the currently selected media type on which the print job is to be printed.

7. The method of claim 6, wherein the currently selected media type is selectable by the user within a host device on which the printer driver is running.

8. The method of claim 6, wherein the currently selected media type is received from the physical printing device with which the printer driver is associated and that will be printing the print job.

9. The method of claim 1, wherein permitting the user to adjust the adjustable printer driver settings comprises permitting the user to differently adjust the adjustable printer driver settings for each page of the print job.

10. The method of claim 1, wherein permitting the user to adjust the adjustable printer driver settings comprises permitting the user to differently adjust the adjustable printer driver settings for a selected group of pages of the print job.

11. The method of claim 1, further comprising, permitting the user to determine which of the pages of the print job are to be actually printed by the physical printing device.

12. The method of claim 11, wherein permitting the user to determine which of the pages of the print job are to be actually printed by the physical printing device comprises permitting the user to drag those of the pages of the print job that are not to be printed on a trash can icon within a graphical user interface.

13. The method of claim 1, further comprising analyzing content of the print job, such that the adjustable printer driver settings are displayed in accordance with a type of the content of the print job.

14. The method of claim 1, wherein at least one of the adjustable printer driver settings each correspond to a separate functionality, adjustment of the functionality resulting in changes to one or more undisplayed lower-level printer driver settings.

15. A computing system comprising:

an application program within which a document is generated; and, a printer driver to:

in response to a user selecting a print command within the application program and then in response to the user pressing a print button or an OK button on a dialog box displayed as a result of the user selecting the print command within the application program, receive a print job corresponding to the document from the application program, determine the application program that generated the print job, permit a user to adjust adjustable printer driver settings of the printer driver, and after receiving the print job and determining the application program that generated the print job, select and display one or more pages of the print job as adjustments are made to the adjustable printer driver settings, wherein the printer driver is for a physical printing device adapted to print on physical media, the adjustable printer driver settings are specific to the physical printing device to which the printer driver corresponds, and the adjustable printer driver settings are selected in accordance with a type of the application program that generated the print job, wherein the printer driver is to display a window different than the dialog box, the adjustable printer driver settings and the pages of the print job being displayed within the window such that both the adjustable printer driver settings and the pages of the print job are simultaneously viewable within the window without the adjustable printer driver settings overlapping the pages of the print job and vice-versa, and wherein the user can adjust the adjustable printer driver settings in the window, such that the pages of the print job are automatically redisplayed based on adjustments made to the adjustable printer driver settings, where the pages of the print job are automatically redisplayed to reflect the adjustments made to the adjustable printer driver settings without the user having to provide further input to cause the pages of the print job to be redisplayed to reflect the adjustments made to the adjustable printer driver settings.

16. The computing system of claim 15, wherein the printer driver is further to permit the user to differently adjust the adjustable printer driver settings for each page of the print job.

17. The computing system of claim 15, wherein the printer driver is further to permit the user to determine which of the pages of the print job are to be actually printed by the physical printing device with which the printer driver is associated.

18. The computing system of claim 15, wherein the printer driver is further to analyze content of the print job, and is to display the adjustable printer driver settings in accordance with a type of the content of the print job.

19. The computing system of claim 15, wherein the printer driver is further to display the adjustable printer driver settings in accordance with a printing task type selected for the print job by the user.

20. The computing system of claim 15, wherein the printer driver is further to display the adjustable printer driver settings in accordance with a currently selected media type on which the print job is to be printed.

21. The computing system of claim 15, further comprising a printing device with which the printer driver is associated, the printer driver being further to send the print job to the physical printing device upon the user approving the adjustable printer driver settings for the print job.

22. The computing system of claim 15, wherein the application program is to generate the print job corresponding to the document for printing on the physical printing device, but the printer driver first permits the user to adjust the adjustable printer driver settings before the print job is actually printed.

23. A computing system comprising:
means for generating a document; and,
means for:
in response to a user selecting a print command within the application program and then in response to the user pressing a print button or an OK button on a dialog box displayed as a result of the user selecting the print command within the application program,
receiving a print job corresponding to the document, for permitting a user to adjust adjustable printer driver settings of a printer driver for a physical printing device adapted to print on physical media, determining the application program that generated the print job, and for, after receiving the print job and determining the application program that generated the print job, selecting and displaying one or more pages of the print job as adjustments are made to the adjustable printer driver settings,
wherein the adjustable printer driver settings are specific to the physical printing device to which the printer driver corresponds, and the adjustable printer driver settings are selected in accordance with a type of the application program that generated the print job,
wherein the means is to display a window different than the dialog box, the adjustable printer driver settings and the pages of the print job being displayed within the window such that both the adjustable printer driver settings and the pages of the print job are simultaneously viewable within the window without the adjustable printer driver settings overlapping the pages of the print job and vice-versa, and
wherein the user can adjust the adjustable printer driver settings in the window, such that the pages of the print job are automatically redisplayed based on adjustments made to the adjustable printer driver settings, where the pages of the print job are automatically redisplayed to reflect the adjustments made to the adjustable printer driver settings without the user having to provide further input to cause the pages of the print job to be redisplayed to reflect the adjustments made to the adjustable printer driver settings.

24. The computing system of claim 23, wherein the means for receiving the print job is further for permitting the user to differently adjust the adjustable printer driver settings for each page of the print job.

25. The computing system of claim 23, wherein the means for receiving the print job is further for permitting the user to determine which of the pages of the print job are to be actually printed by the physical printing device.

26. A computer-readable medium having a computer program stored thereon comprising:
a first computer program part to receive a print job corresponding to a document received from an application program and to determine the application program that generated the print job;
a second computer program part to, after the print job has been received and after the application program that generated the print job has been determined, select and display and to permit a user to adjust one or more adjustable printer driver settings of a printer driver for a physical printing device adapted to print on physical media, the adjustable printer driver settings specific to the physical printing device to which the printer driver corresponds, the adjustable printer driver settings selected in accordance with a type of the application program that generated the print job; and,
a third computer program part to display one or more pages of the print job in accordance with the adjustable printer driver settings, as the adjustable printer driver settings are adjusted,
wherein the first computer program part is to receive the print job, the second computer program part is to display and to permit the user to adjust the adjustable printer driver settings, and the third computer program part is to display the pages of the print job all in response to the user selecting a print command within an application program, and then in response to the user pressing a print button or an OK button on a dialog box displayed as a result of the user selecting the print command within the application program,
wherein the second computer program part is to display the adjustable printer driver settings within a window different than the dialog box, the third computer program part is to display the pages of the print job within the window, such that the adjustable printer driver settings and the pages of the print job are displayed within the window in a manner in which both the adjustable printer driver settings and the pages of the print job are simultaneously viewable within the window without the adjustable printer driver settings overlapping the pages of the print job and vice-versa, and
wherein the user can adjust the adjustable printer driver settings in the window, such that the pages of the print job are automatically redisplayed based on adjustments made to the adjustable printer driver settings, where the pages of the print job are automatically redisplayed to reflect the adjustments made to the adjustable printer driver settings without the user having to provide further input to cause the pages of the print job to be redisplayed to reflect the adjustments made to the adjustable printer driver settings.

27. The computer-readable medium of claim 26, wherein the second computer program part is further to permit the user to differently adjust the adjustable printer driver settings for each page of the print job.

28. The computer-readable medium of claim 26, wherein the second computer program part is further to permit the user to determine which of the pages of the print job are to be actually printed by the physical printing device.

* * * * *